United States Patent [19]
Weetall et al.

[11] 3,852,496
[45] Dec. 3, 1974

[54] TREATMENT OF WHEY WITH IMMOBILIZED LACTASE AND GLUCOSE ISOMERASE

[75] Inventors: Howard H. Weetall, Elmira; Sidney Yaverbaum, Big Flats, both of N.Y.

[73] Assignee: Corning Glass Works, Corning, N.Y.

[22] Filed: Sept. 4, 1973

[21] Appl. No.: 394,294

[52] U.S. Cl............. 426/41, 426/42, 426/217, 426/239, 195/31 R, 195/68
[51] Int. Cl............................................. C07g 7/02
[58] Field of Search .......... 195/63, 68, DIG. 11, 34, 195/31 R, 31 F; 426/41, 42, 239, 356, 217

[56] References Cited
UNITED STATES PATENTS

| | | | |
|---|---|---|---|
| 2,681,858 | 6/1954 | Stimpson | 426/41 |
| 3,705,084 | 12/1972 | Reynolds | 195/63 |
| 3,753,725 | 8/1973 | Williams et al. | 195/31 R |
| 3,783,101 | 1/1974 | Tomb et al. | 195/63 |

OTHER PUBLICATIONS

Webb, et al., By products from Milk, 2nd ed., The Am. Publ. Co., Inc., Westport, Conn., 1970, (pp. 315 and 316), SF239.W58.

*Primary Examiner*—David M. Naff
*Attorney, Agent, or Firm*—James A. Giblin; Clarence R. Patty, Jr.

[57] ABSTRACT

Whey or an ultrafiltrate of whey is treated to produce useful sweeteners by a method involving reacting whey with immobilized lactase to hydrolyze lactose to glucose and galactose, removing calcium ions from the whey, adjusting the pH of the whey to above 7 and reacting the whey with immobilized glucose isomerase to isomerize glucose to fructose.

4 Claims, 3 Drawing Figures

TREATMENT OF WHEY WITH IMMOBILIZED LACTASE AND GLUCOSE ISOMERASE

BACKGROUND OF THE INVENTION

1. Field

This invention relates generally to the treatment of solutions with immobilized enzyme systems, and particularly to the treatment of whey and whey by-products with enzymes which have been immobilized on high surface area, porous, inorganic carrier materials.

Whey is the serum or watery part of milk which has been separated from the more thick or coagulable part known as curd. Acid whey is a by-product of cottage cheese manufacture. Sweet whey is a product of cheddar cheese manufacture. The whey materials generally contain protein, lactose, lactic acid, and various salts as major components.

Recently, many dairies have begun to treat acid whey by ultrafiltration and reverse osmosis in a major attempt to recover the very valuable milk protein. The major waste product of this process (e.g., the ultrafiltrate) is a slightly acidified lactose solution generally contaminated with small quantities of mineral salts, lactic acid, and riboflavin. This product is clear, green in color, and commonly contains about 15 to 20 percent solids of which about 7 to 8 percent is lactose.

Because of the relatively high salt concentration and low nitrogen content in the ultrafiltrate, the lactose-containing waste product has little or no value as a fertilizer or animal feed. Thus, the by-products resulting from the processing of whey are presently of little commercial value. In fact, the waste products are often of negative value in areas where dairies must pay a surcharge for discharging the by-product into sewage systems. Because of such surcharges and because of a growing awareness of the undesirable consequences of pollution in general, investigators have recently attempted to find methods of treating whey and whey by-products such as the whey ultrafiltrates, to minimize or avoid their polluting effects or, better yet, to recycle the waste products to useful products. Inasmuch as lactose is one of the main components of both whey and whey ultrafiltrates, recent attention has been directed toward finding method of economically removing the lactose and/or converting it to useful products.

2. Prior Art

Lactose is a disaccharide sugar, $C_{12}H_{22}O_{11}$, that on hydrolysis yields glucose and galactose, and on fermentation yields mainly lactic acid. It is well known that lactose can be hydrolyzed in a variety of ways, one of which involves using an enzyme known as beta-galactosidase, or commonly referred to as lactase. It is also known that lactase can be immobilized on high surface area porous glass particles by coupling the enzyme covalently to the glass surface through an intermediate silane coupling agent. See the article entitled, "Covalent Bonding of Fungal Beta-Galactosidase to Glass" by J. H. Woychick and M. V. Wondolowski, Biochim. Biophys. Acta, 289, pp. 347-351 (1972). Further, in U.S. Pat. No. 3,519,538, issued in the names of R. A. Messing and H. H. Weetall, there are disclosed methods for coupling a wide variety of enzymes to various inorganic materials, including porous glass particles, through intermediate silane coupling agents. In the immobilization of enzymes, various advantages have been found in using essentially water-insoluble inorganic carriers instead of organic carriers. Some of the advantages are referred to in the above patent.

In general, inorganic carriers are preferred in many applications because of their rigidity, non-swellability, and because they are commonly not subject to microbial attack and are available with very high surface areas. Porous glass particles have been found especially useful as carriers for enzymes because such particles have a very large surface area per gram (e.g., up to and greater than 100 m²/g) and such particles are available having a very closely controlled average pore diameter. Hence, such porous glass particles are commonly referred to as controlled pore glass or CPG. Such glass can be made, for example, in accordance with the teachings of U.S. Pat. No. 3,549,524, issued to Haller, and U.S. Pat. No. 3,985,687, issued to Chapman. Further, porous glass particles are available commercially under such designations as Corning Code GZO-3900 porous glass and Corning Code MZO-3900 zirconia clad porous glass.

Inasmuch as porous glass tends to slowly dissolve in an alkaline environment (where many enzymes have their pH optima), there have been developed various methods to treat the surface of porous glass particles to enhance their overall durability. See, for example, United States Application Ser. No. 227,205, now U.S. Pat. No. 3,783,101, filed in the names of W. Tomb and H. H. Weetall on Feb. 17, 1972, and entitled "Improved Enzyme Carriers," the application being assigned to the present assignee. In the above-entitled patent application, methods are disclosed for treating the surface of porous glass with a metal-containing solution and then firing the treated glass to form a metal oxide surface layer on the glass, the metal oxide being more durable than the untreated glass surface and, hence, enhancing the overall durability of the glass carrier.

As disclosed in the above application, the formation of a thin zirconia layer on the surface of porous glass has been found particularly effective in not only enhancing the alkaline durability of the porous glass but also in enhancing the enzymatic half-life of an immobilized enzyme composite formed therewith. A particularly useful composite having such a thin zirconia coating on porous glass comprises the enzyme glucose isomerase coupled chemically to such a carrier through an intermediate silane coupling agent. As used herein, the term "zirconia coated porous glass particles" refers to those treated particles described more fully in Ser. No. 227,205, now U.S. Pat. No. 3,783,101, noted above. In the examples below, we used zirconia-coated porous glass particles known commercially as Corning Code MZO-3900 zirconia-clad porous glass particles. Such particles have an average pore diameter of 550A, an average particle size between about 20 and 80 mesh, and a typical surface area of about 82 m²/g.

Although it is well known that enzymes can be successfully immobilized on various inorganic carriers, especially high surface area porous inorganic carriers, we are unaware of the use of such immobilized enzyme composites to successfully treat whey and its waste products in such a way that the polluting effects of such products are avoided by recycling the products as useful sweeteners. We have now found that the waste products of whey separations, and whey itself, can be successfully converted to useful sweeteners by the novel methods disclosed more fully hereunder.

SUMMARY OF THE INVENTION

We have found that whey and the waste products of whey processing can be successfully recycled by reacting such products with an immobilized enzyme composite comprising beta-galactosidase coupled covalently to a porous, high surface area inorganic carrier through an intermediate silane coupling agent. The major reaction products, galactose and glucose, can then be used as sweeteners (for example, in dairy products) or preferably reacted further with an immobilized enzyme composite comprising glucose isomerase coupled covalently to a porous, high surface area carrier through an intermediate silane coupling agent to produce a fructose-containing product with a sweetening value approaching that of sucrose on an equivalent weight basis. In preferred embodiments, concentrated whey waste products are initially concentrated and then treated to remove waste salts and then continuously passed through plug flow-through columns containing, in respective succession, composites comprising the enzymes beta-galactosidase and glucose isomerase, each of said enzymes being covalently coupled to porous, high surface area inorganic carriers such as porous glass particles or surface treated (zirconia-coated) porous glass particles through silane coupling agents.

SPECIFIC EMBODIMENTS

The immobilization of enzymes on porous, high surface area inorganic carriers through silane coupling agents is described in U.s. Pat. No. 3,519,538, which was noted above. The carriers described therein, in porous form, may be used to covalently bond (through silane coupling agents) the enzymes beta-galactosidase (lactase) and glucose isomerase. The inorganic carriers should be porous and must have a high surface area (e.g., greater than about 5 m²/g) to assure sufficient loading of the enzymes. The average pore diameter is preferably closely controlled and between about 250A and 1,000A preferably about 550A ± 10 percent. Also, the surface of the inorganic carriers must have available hydroxyl or oxide groups to bond with the silicon portion of the silane coupling agents. Particle size is also important and it should be between about 20 and 80 mesh, U.S. Standard Sieve, so that the enzymes can readily diffuse into the porous network for bonding and so that the respective substrates can readily diffuse into the carrier to the bonded enzymes.

In a preferred embodiment, both enzymes are chemically coupled to the zirconia-coated porous glass particles described below. Further details describing how to make such particles can be found in the above-described patent application Ser. No. 227,205, now U.S. Pat. No. 3,783,101. Inasmuch as the present invention is concerned primarily with novel uses of immobilized enzymes to treat waste products of cheese processing, it is thought that a detailed description of the available techniques for covalently bonding the enzymes to high surface area porous inorganic materials is unnecessary. Particularly useful methods of bonding the enzymes beta-galactosidase and glucose isomerase are, however, described in detail below. It should be pointed oute that the zirconia-coated porous glass particles are preferred carrier materials, especially for the bonding and use of glucose isomerase which has an alkaline pH optimum.

Figure 1:
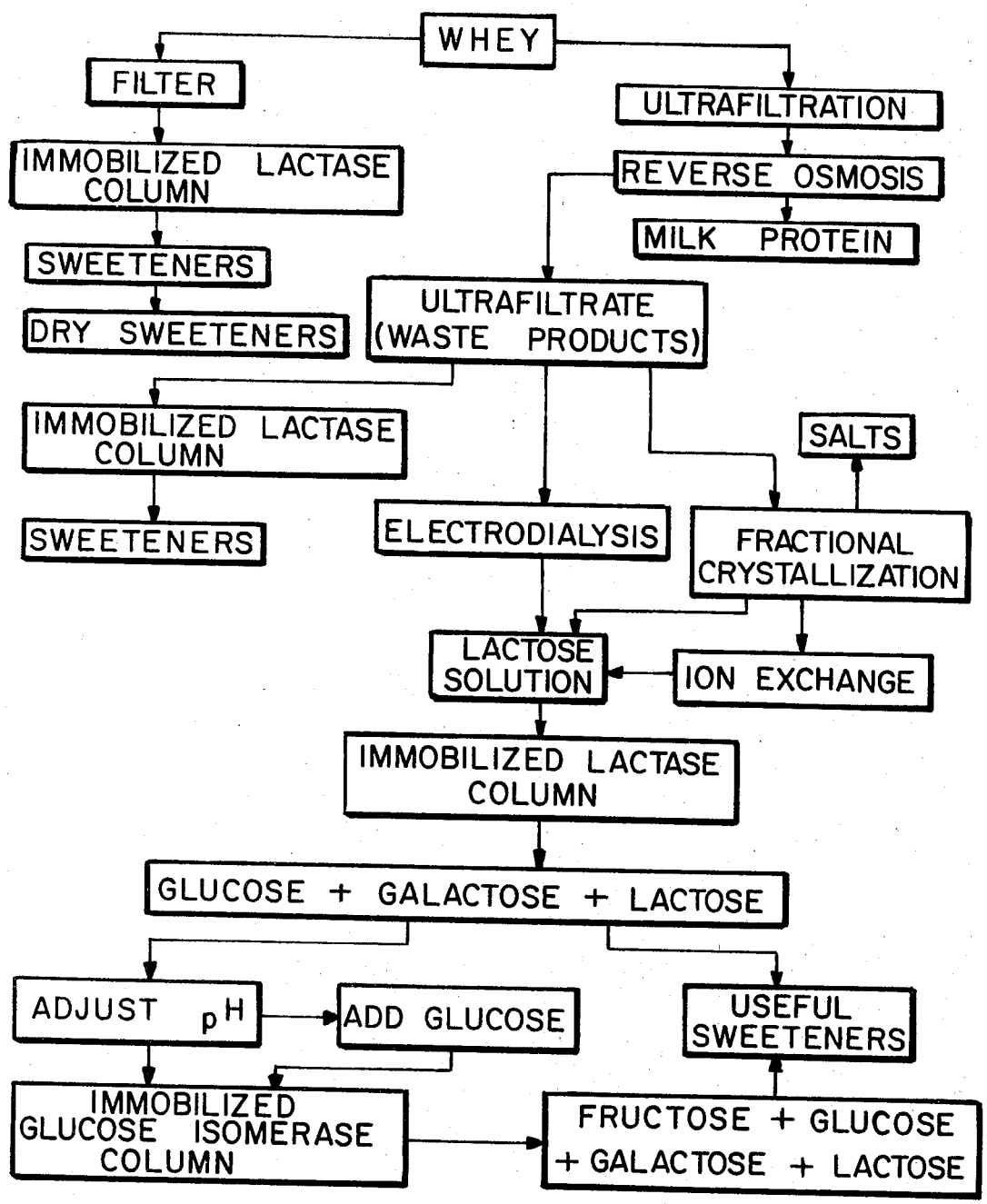
FIG. 1 is a generalized flow sheet showing the methods by which whey and the by-products of whey processing may be treated to yield useful products.

The various methods of treating whey and by-products of whey processing with the immobilized enzymes are shown generally in FIG. 1. There, it can be seen that whey itself may be initially filtered and then passed through a column containing immobilized lactase to yield sweeteners. These sweeteners can be subsequently dried for more convenient storage. The immobilized lactase partially hydrolyzes the lactose in the filtered whey. The ultimate product will also contain some protein.

In a more preferred method, however, the whey is subjected to the steps of ultrafiltration and reverse osmosis to yield valuable milk protein and an ultrafiltrate of waste products containing lactose which can be further treated to yield useful sweeteners. The ultrafiltrate (waste products) are preferably treated by electrodialysis or fractional crystallization and ion exchange (to remove such undesirable ions as calcium) to remove most salts. The steps of ion exchange and fractional crystallization are desirable to remove ions or salts which may interfere with the product taste or with the subsequent treatments with immobilized enzymes. For example, as discussed below, it was found that the presence of calcium ions in the whey ultrafiltrate tended to interfere with the immobilized glucose isomerase. Hence, it is desirable that such ions be removed by either of the above methods prior to enzymatic treatment.

After removal of the majority of salts and/or undesirable ions, the waste product consists mainly of lactose and small quantities of riboflavin and lactic acid. If desired, the riboflavin may be removed by passing the product through, for example, a column containing activated charcoal. The product then consists mainly of lactose in solution. By passing the lactose-containing soluton through a plug flow-through column reactor, containing the immobilized lactase, the lactose hydrolyzes to the sugars glucose and galactose with some lactose remaining. This solution of sugars can be used directly (e.g., by a dairy) as a useful sweetener, or, very preferably, treated further by passing the solution through another column reactor containing immobilized glucose isomerase, described in detail below. Since glucose isomerase isomerizes glucose to fructose, the solution, after passing through the column, will consist of fructose, glucose, galactose and some lactose. Inasmuch as the fructose is about twice as sweet as glucose, on an equivalent weight basis, the passage of the solution through the glucose isomerase column is an especially desirable step. In fact, additional glucose may be added to the solution prior to passage through the column containing the immobilized glucose isomerase to assure the formation of even greater amounts of fructose. The final product consists of a solution of fructose, glucose, galactose, and lactose, and may be used as a sweetener in, for example, the manufacture of ice cream. It is important to note that prior to the passage of hydrolysate through the column containing the immobilized glucose isomerase, the pH of the acidic hydrolysate must be adjusted to above 7.0 to a range in which glucose isomerase has an optimum pH.

PREPARATION OF IMMOBILIZED
BETA-GALACTOSIDASE (LACTASE)

The reagents used were all reagent grade or better unless otherwise stated. Fungal lactase (lactase-M) was supplied by Miles Laboratories. Yeast lactase (lactase-Y) was supplied by Kyowa Hakko Kogyo Co., Tokyo, Japan. The glucose isomerase was from U.S.D.A. Northern Regional Laboratory, Peoria, Illinois. The whey and whey ultrafiltrate came from a local diary.

The lactase enzymes were immobilized on zirconia-coated porous "96 percent silica" glass particles having an average pore diameter of 550A ± 10 percent (Corning Code MZO-3900). The zirconia-coated porous glass particles were silanized with gamma-aminopropyltriethoxysilane by an aqueous method as described in an article by H. H. Weetall and N. B. Havewala, Biotechnol. Bioeng. Symp. No. 3, 241 (1972). The enzymes were covalently attached to the alkylamine glass particles, using glutaraldehyde, by the procedure generally described in the above article.

Prior to their use in the treatment of whey and whey ultrafiltrates, the immobilized lactase enzymes were assayed as were free common soluble specimens of the same enzymes. This was done to determine whether or not there would be any effect of the immobilization procedure on the pH optima of the immobilized enzymes.

The soluble lactase-Y was assayed in 20 percent lactose dissolved in 0.025 M sodium phosphate buffer, pH 6.5, containing $5 \times 10^{-4}$ M manganese and cobalt chlorides, respectively. The lactase-M was assayed in the same buffer without the metal salts. All assays were for 30 minutes at 60°C. Percent hydrolysis was determined by glucose appearance, since one mole of lactose produces one mole of glucose and one mole of galactose. Glucose measurements were performed using the Glucostat reagent produced by Worthington Biochemical Corporation, Freehold, N. J. One unit of activity was defined as the production of 1 micro mole of glucose/minute at 60°C. at optimum pH. All assays were carried out in a 5 ml total volume at optimum pH.

The immobilized enzyme derivatives were assayed in a total substrate volume of 10 ml in 25 ml flasks. The flasks were shaken to assure thorough mixing during the assay. Sample sizes ranged from 5.0 mg to 50.0 mg immobilized enzyme derivatives. Specific activity of the immobilized enzymes was determined as units/gram on a dry weight basis.

Figure 2:
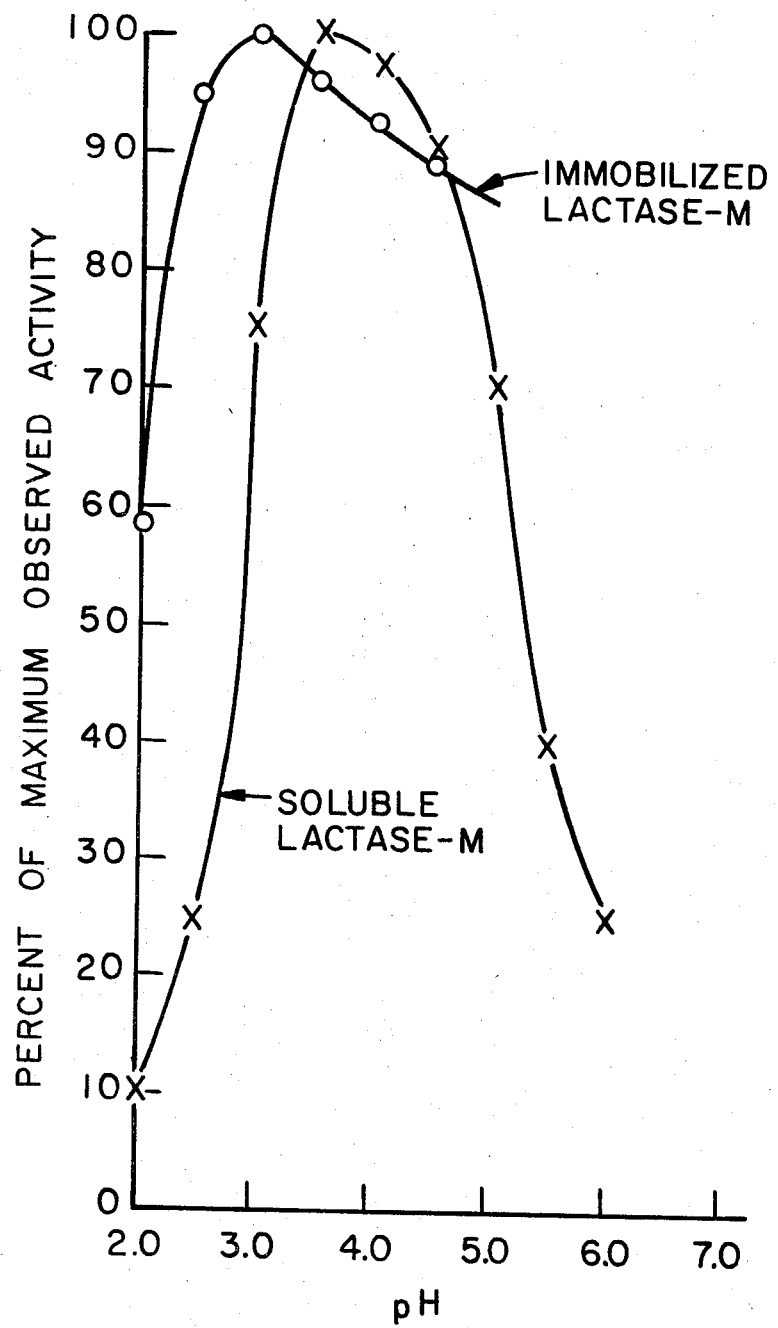
FIG. 2 is a plot showing the effect of pH on the observed activity of both soluble and immobilized lactase from one
Figure 3:
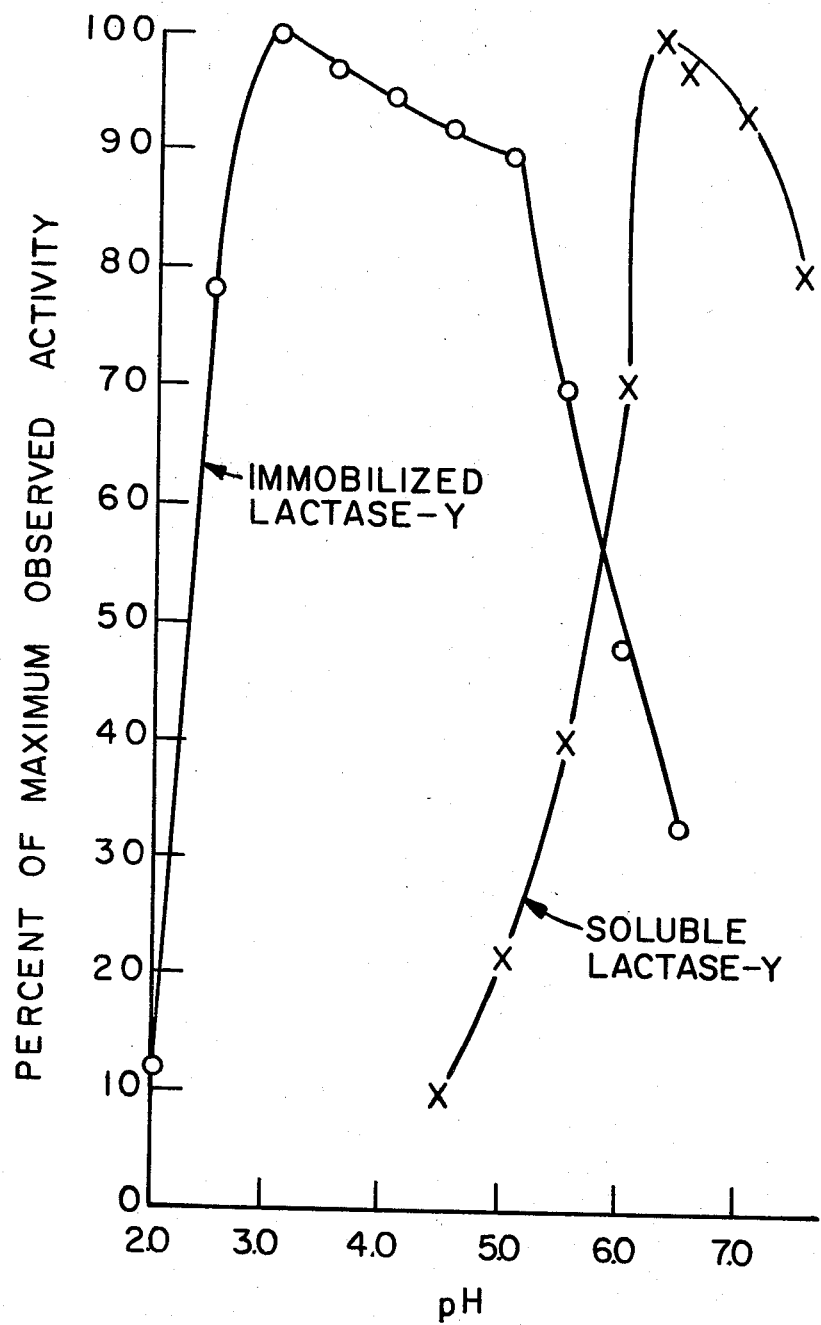
FIG. 3 is a plot showing the effect of pH on the observed activity of both soluble and immobilized lactase from another source.

The pH profiles were determined for both the soluble and immobilized lactase enzymes. As can be seen in FIGS. 2 and 3 the pH profiles for the immobilized products and the soluble products are quite different. In the case of lactase-M the soluble enzyme shows an optimum at pH 4.0. Immobilization on zirconia-coated CPG causes a shift in pH optimum from 4.0 to pH 3.5. However, at 4.0 the immobilized enzyme still shows 96 percent of maximum activity. The lactase-Y results were quite unusual. Immobilization caused a pH shift of 3.25 pH units from pH 6.25 to pH 3.0, such that the immobilized enzyme had only 40 percent of maximum activity at 6.25. The differences in the behavior of the two lactases is not fully understood.

In the experiments below, both the ultrafiltrate of whey and cheddar cheese whey were initially exposed to immobilized enzymes without any adjustments in their general pH range of 4.3 to 4.6.

EXAMPLE I

TREATMENT OF A LARGE BATCH OF WHEY ULTRAFILTRATE FOR USE IN ICE CREAM AS A SUCROSE REPLACEMENT

Approximately four gallons of whey ultrafiltrate were continuously passed through a lactase-Y plugged flow-through column containing 22,000 units of activity over a seven-day period. The starting material was approximately 15% solids of which 70 percent was lactose. The remainder included calcium, lactic acid, riboflavin, and some residual protein. The hydrolyzed sample was collected over seven days of operation, pooled, filtered through activated charcoal to remove the riboflavin, and neutralized with a 50 percent solution of NaOH for treatment with the immobilized glucose isomerase. On neutralization, a large white precipitate formed. This was removed and found to consist mostly of calcium phosphate. The remaining clear neutralized hydrolysate was then tested with immobilized glucose isomerase for conversion to fructose.

Glucose isomerase was prepared in a manner similar to that used for the preparation of the immobilized lactase. Glutaraldehyde was used for the coupling procedure. One gram of immobilized glucose isomerase containing 525 units (one unit is equivalent to the production of one micro mole of fructose at 60°C. per minute) was added to 50 ml of whey ultrafiltrate previously adjusted to pH 7.5 and buffered to 0.005 M in magnesium ions by adding $MgCl_2$. The test was carried out for 1 hour at 60°C. in a shaking water bath. No conversion was observed. It become apparent that the glucose isomerase had been inactivated by the presence of calcium ions found in whey. The calcium ions were removed by ionic change with a cation exchange resin. The assay was repeated again and with success. The quantity of glucose in the assay solution was decreased by 50 percent, indicating the maximum isomerization possible.

The whey was continuously passed through a similar column containing the immobilized glucose isomerase. To insure that the final product would be at least equivalent to sucrose on a sweetening basis, an additional 5 percent by weight glucose was added to the remainder of the four gallons of hydrolyzed whey ultrafiltrate before isomerization. The isomerization was carried out in a column containing 50 grams of the immobilized glucose isomerase described above. The flow rate was maintained at 200 ml/hour. The product was submitted to a dairy for use in preparing an ice cream sample, the results of which are described below.

The final product, after hydrolysis with lactase-Y, the addition of glucose and magnesium chloride, and after isomerization, was found to have the following constituents by weight of solids: 1 percent lactose, 45 percent galactose, 20 percent fructose, and approximately 25 percent glucose. The total solids were initially 15 percent, while the final solids content was approximately 10 percent.

EXAMPLE II

HYDROLYSIS OF WHOLE CHEDDAR CHEESE WHEY WITH IMMOBILIZED BETA-GALACTOSIDASE

Whole cheddar cheese whey was filtered through diatomaceous earth (Celite) to remove insoluble particles. The clarified solution was then passed through a column containing lactase chemically coupled to zirconia-coated porous glass particles, as described above. The column was a plugged flow-through glass column reactor (1 centimeters by 10 centimeters in length) and contained 8 grams of the immobilized lactase having 550 units of enzyme activity per gram. The clarified whey was passed through the column at a flow rate necessary to permit 50 percent hydrolysis of the lactose present in the whey (about 100 ml per hour). A two liter sample of the hydrolyzed product was evaporated to 40 percent solids and used for the preparation of an ice cream sample at the maximum acceptable level for the addition of whey as permitted by law (25 percent wt./wt.). From this example, it was found that whole cheddar cheese whey also can be successfully hydrolyzed to useful sweeteners with an immobilized enzyme composite consisting of lactase coupled chemically to zirconia-coated porous glass particles.

From the above procedures, it can be seen that immobilized lactase alone, or preferably immobilized lactase and immobilized glucose isomerase taken together, can be used for the treatment of waste products of whey or whey itself to produce two types of useful sweeteners. Ideally, the sweeteners could be used at the dairy from which the whey is processed, although the sweeteners also have utility in non-dairy applications. From the experiments above, it was found that the product obtained by hydrolyzing the whey waste products with the immobilized lactase was not as sweet as sucrose on a dry pound-for-pound basis. Thus, inasmuch as many dairies may prefer an end product to be used as a sucrose replacement at a pound-for-pound basis, the hydrolysate containing the glucose and galactose can be passed through the second column containing the immobilized glucose isomerase. To make that end product (fructose, glucose, and galactose) equivalent in sweetness to an equal weight of sucrose, some glucose may be added to the hydrolysate prior to its passage through the column containing the immobilized glucose isomerase.

We claim:

1. A method of treating a solution of whey containing lactose to produce useful sweeteners which comprises the steps of reacting the solution with a composite comprising beta-galactosidase covalently bonded to a high surface area, porous glass material through an intermediate silane coupling agent to hydrolyze a portion of the lactose to glucose and galactose; removing the majority of the calcium ions from the solution; adjusting the pH of the solution above 7.0; and then reacting the solution with a composite comprising glucose isomerase covalently bonded to a high surface area, porous glass material through an intermediate silane coupling agent to isomerize a portion of the glucose to fructose.

2. The method of claim 1 wherein, prior to reaction with the first composite, the whey solution is subjected to an ultrafiltration step to yield a whey ultrafiltrate containing lactose.

3. The method of claim 2 wherein the porous glass material of both composites consists of zirconia-coated porous glass particles.

4. The method of claim 3 wherein the reactions take place by continuously passing the solution through plug flow-through columns containing, in respective succession, the composites.

* * * * *